J. H. WAGENHORST.
VEHICLE WHEEL RIM.
APPLICATION FILED MAY 20, 1911.
1,201,117.
Patented Oct. 10, 1916.
2 SHEETS—SHEET 1.
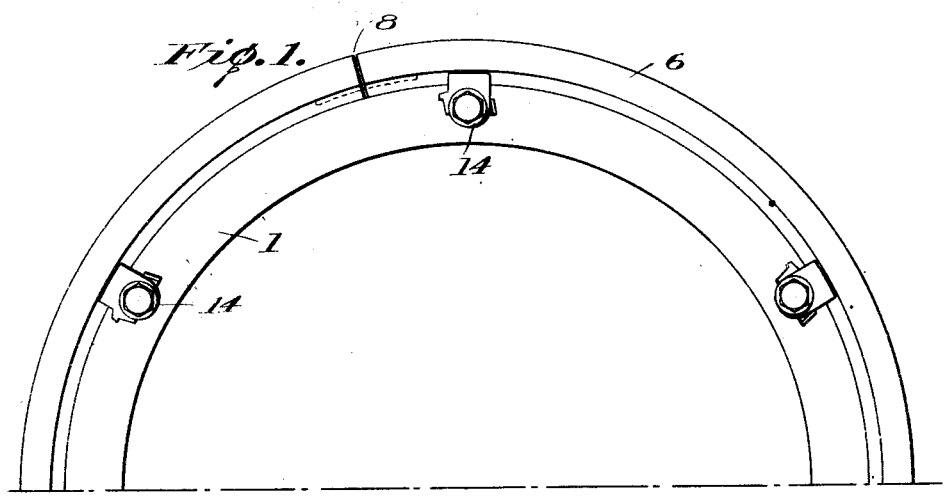
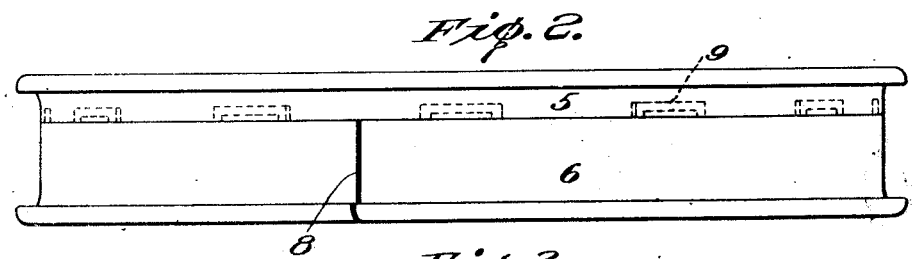
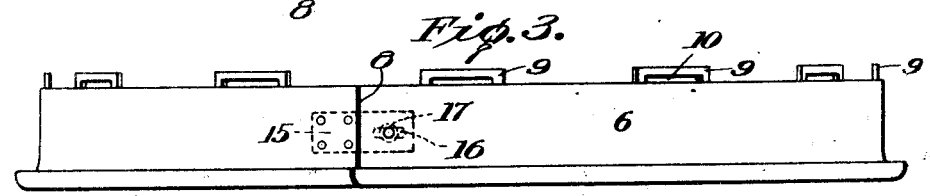
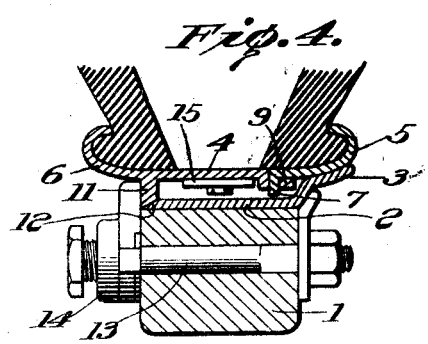
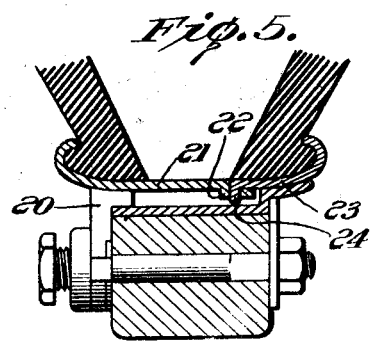
James H. Wagenhorst, Inventor J. H. WAGENHORST.
VEHICLE WHEEL RIM.
APPLICATION FILED MAY 20, 1911.
1,201,117.
Patented Oct. 10, 1916.
2 SHEETS—SHEET 2.
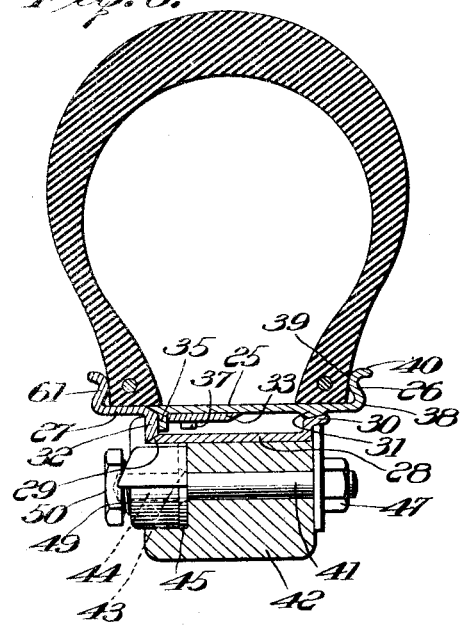
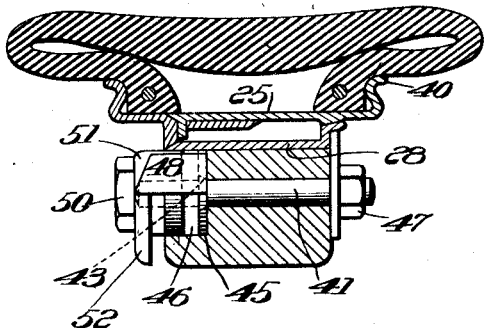
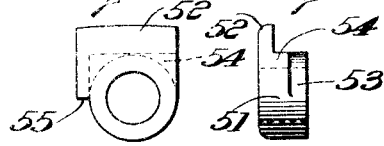
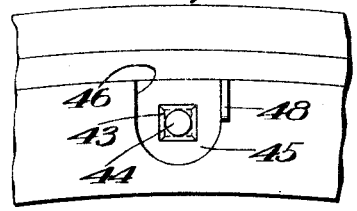
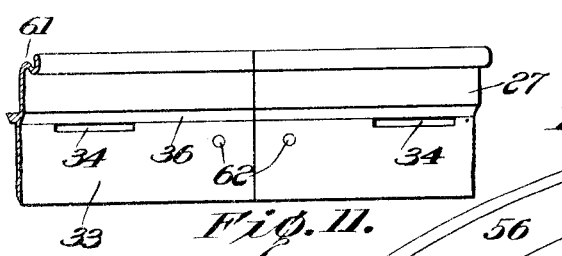
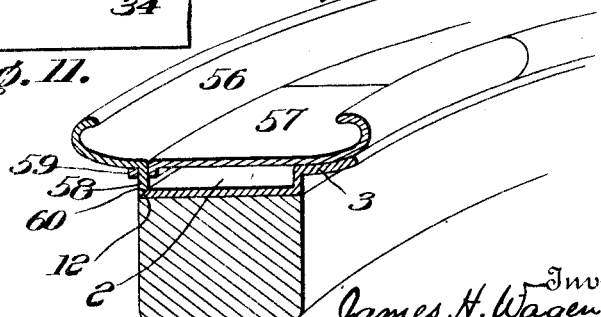
Witnesses:
Gerald E. Terwilliger
Edmund Quincy Moses
Inventor
James H. Wagenhorst
By his Attorney
Seward Davis

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,201,117.   Specification of Letters Patent.   Patented Oct. 10, 1916.

Application filed May 20, 1911.  Serial No. 628,385.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

This invention relates to improvements in vehicle wheel rims of that class adapted to carry a pneumatic or other resilient tire.

It contemplates an improved structure of tire-carrying rim adapted to be removably mounted upon a vehicle wheel, the rim being separable in such manner as to facilitate the application and removal of the resilient tire and to permit the application thereto of pneumatic or other resilient tires with inextensible beads.

It also contemplates an improved shape or cross-section of rim adapted to hold straight-sided pneumatic tires.

It also contemplates improvements in attaching devices for securing demountable tire-carrying rims upon vehicle wheels.

In the accompanying drawings which form a part of this specification, Figure 1 is a side elevation of a portion of a wheel felly carrying a rim embodying one form of my invention; Fig. 2 is a plan view of the rim shown in Fig. 1; Fig. 3 is a plan view of the split member of the rim shown in Figs. 1 and 2; Fig. 4 is a transverse sectional view through the rim and felly shown in Fig. 1; Fig. 5 is a view similar to Fig. 4, showing a modified means for attaching the rim to the felly; Fig. 6 is a view similar to Fig. 4, illustrating a different form of tire-carrying rim embodying my invention, and also illustrating an improved attaching device; Fig. 7 is a view similar to Fig. 6, showing the keeper forming a part of the attaching device moved to inoperative position, and also illustrating the pneumatic tire deflated and flattened down, as would be the case if the wheel were run upon a flat tire; Fig. 8 is an elevation of the keeper looking at the outside thereof; Fig. 9 is a side elevation or edge elevation of the keeper; Fig. 10 is a side view of a portion of the felly with the felly band attached and the rim mounted thereon, the keeper and nut or sleeve being removed; Fig. 11 is a plan view of a portion of the transversely split member of the rim shown in Fig. 6; Fig. 12 is a perspective view of a portion of a felly and felly band having a modified form of my improved tire-carrying rim mounted thereon.

While I have shown in the drawings and will now describe in detail certain preferred embodiments of my invention, I do not desire to be understood as limiting myself to these specific forms, as they are intended to be merely illustrative of my inventive idea and of the best mode now known to me for applying the same.

Referring to the drawings in detail, the numeral 1 designates the wheel felly, to which is permanently secured by shrinking or otherwise the felly band 2, which may be provided at one side thereof with the raised flange 3 adapted to support one side of the tire-carrying rim. The tire-carrying rim is designated by the numeral 4 and is constructed according to this embodiment of my invention of two laterally separable bands 5 and 6, each carrying a tire-retaining flange. The band or ring 5 is continuous or endless, and is provided along its edge adjacent the band or ring 6 with a plurality of spaced inwardly projecting lugs 7, preferably formed by bending or striking down portions of the ring or band. The ring or band 6 is transversely split, as indicated, at 8 and is provided along its edge adjacent to the ring 5 with a series of lugs 9 preferably offset below the level of the outer surface of the ring, as shown, and provided with slots 10 adapted to receive the lugs 7. It will thus be seen that the bands or rim members 5 and 6 may be secured together by collapsing the split ring 6 in order to permit the lugs 9 to be inserted beneath the lugs or projections 7 and then expanding the ring to cause the projections 7 to enter the slots 10. This will effectually prevent the separation of the rim parts and make the same as strong for all practical purposes as a one-piece tire-carrying channel or rim.

The tire-carrying rim may be secured upon the felly of the wheel in any suitable manner; for example, the split band 6 may be provided with an inwardly projecting flange 11 having a beveled face adapted to engage with a beveled face 12 formed at the edge of the felly band 2. The band or rim member 5 will be supported by the flange 3 at the other edge of the felly band. For forcing the rim laterally upon the felly band to bring the respective supporting surfaces into engagement, any suitable means may be used, such as a series of bolts 13 passing through the felly and carrying eccentric keepers 14. The specific construction of these keepers need not be illustrated or described in detail, as the same forms the subject-matter of my application Serial Number 589,680, filed October 29, 1910. I do not wish to limit myself, however, to this particular form of locking means. The engagement between the flange 11 on the split member 6 and the inclined surface 12 on the felly band serves to expand the split member into close engagement with the endless member 5, and to effectually prevent the collapse of the split member while the rim is mounted upon the wheel. When the rim is removed from the wheel the abutment of the ends of the split member and the frictional engagement of the walls of the slots 10 with the lugs or projections 7, and the engagement of the flange on the member 6 with the head of the tire are ordinarily found sufficient to prevent the accidental collapse of the split member. I may, however, provide means for locking the ends of the split member together if found desirable or necessary. Any suitable means may be used for this purpose; for example, a plate 15 may be secured to one end of the split ring and project under the other end thereof, the projecting portion being slotted, as indicated in dotted lines in Fig. 3 at 16. A screw 17 passing through this slot and screwing into the end of the split member serves to secure the same to the plate. The removal of this screw will permit the rim to be collapsed, as above described. I do not wish, however, to limit myself to the use of this or any other means for joining the ends of the split member together, as the use of such means is not essential to the operation of the rim.

In Fig. 5 I have shown a rim constructed like the rim shown in Figs. 1 to 4, but secured to the wheel by means of a series of wedges 20 inserted between the rim and the felly band. In this case the rim is not provided with an inwardly projecting flange like the flange 11 shown in Fig. 4. In this figure 21 is the split rim member provided with the slotted lugs 22 similar to the lugs 9 shown in Figs. 3, 4. The endless rim member is designated by 23 and is provided with the inwardly projecting lugs 24 corresponding to the lugs 7 shown in Fig. 4. The wedges 20 serve to hold the split ring 21 expanded, while the endless ring 23 prevents the split ring from expanding too much under the impulse of centrifugal force.

In Figs. 6 to 11, inclusive, I have illustrated a preferred form of my invention in which the tire-carrying rim comprises an endless band 25 carrying one tire-retaining flange 26, and a transversely split band or ring 27 carrying the other tire-retaining flange 61. This form is adapted to be mounted upon a felly band 28 having a beveled face 29 at one edge thereof and a flange 30 at the other edge thereof having a beveled outer face. The face on the flange 30 is engaged by the beveled face of a ridge 31 formed on the band 25, while the band 27 is provided with an inwardly projecting flange 32 having a beveled face adapted to engage the beveled face 29 on the felly band. The split band 27 has a laterally projecting portion 33 offset below the level of the tire-seating surface of the rim and adapted to project under the band 25. A series of slots 34 are formed in this projecting portion, preferably adjacent to the flange 32, these slots being adapted to receive lugs 35 formed upon the band 25. The shoulder 36 on the band 27 and the edge of the band 25, which engages therewith, are preferably beveled, as shown. The parts of this rim are assembled by collapsing the band 27 slightly, inserting the projection 33 under the lugs 35, and then expanding the band to cause the lugs to enter the slots 34. If desired, suitable means may be provided for locking the band 27 in expanded position. These means may be the means shown in Fig. 3, or a screw 37 may be passed through a hole 62 formed in each end of the split band adjacent to the split therein and screwed into the band 25. Any other suitable device may be used for this purpose.

I have shown in Figs. 6, 7 and 11 an improved shape or cross-section of rim for holding straight-sided tires, this rim also embodying the separable construction above described, though this improved cross-section may be embodied in rims of different construction. As will appear from an examination of Figs. 6 and 7, the flanges 61, 26 are not bent up from the base of the rim sharply at right angles, but each is formed upon a curve of contrary flexure, being first curved outwardly away from the tire on a curve of substantial radius, as indicated at 38, and being then curved in to form the tire engaging surfaces 39. It is unnecessary for the tire to seat against the flange throughout its entire width, as the tire is sufficiently supported by the curved surfaces 39. The edges of the flanges beyond the surfaces 39 are curved outwardly to form roll edges, as indicated at 40, in order to eliminate the possibility of rim-cutting in case the tire is run when deflated, as indicated in Fig. 7. By curving the flanges outwardly, as indicated at 38, the sharp corners are eliminated, which are difficult to roll and which as the rolls become worn are no longer sharp and therefore do not receive the substantially rectangular edges of the tire properly. The formation of these sharp corners also weakens the rim. The curving of the flange at 38 also raises that line of the flange subject to tendency to flexure under the stresses imposed by the pressure of the air in the inflated tire to a point considerably above the base of the rim, so that the bending moment exerted upon the flanges by the expansive force of the tire, and tending to spread the same, is considerably reduced.

In Figs. 6, 7, 8, 9 and 10 I have also illustrated an improved attaching device for removably securing a tire-carrying rim (which may be of the form shown in Figs. 6 and 7, or of any other suitable form), upon the wheel felly. This attaching device is a modification of the fastening means shown in my prior application above referred to. This attaching device comprises a bolt 41 passing transversely through the wheel felly 42 and having a collar 43 of rectangular or other angular outline near one end thereof. A portion of the bolt, 44, shown in dotted lines in Figs. 6 and 7, projects beyond the collar 43, this portion of the bolt being externally threaded. The edges of the collar 43 are beveled, as shown in dotted lines in Fig. 6, and the collar is received in a correspondingly shaped opening formed in a felly plate or washer 45. The felly 42 is recessed, as indicated at 46, the recess being substantially the shape of the felly plate, which fits closely into the bottom thereof. The collar on the bolt 41 holds the felly plate in position in the bottom of this recess, the end of the bolt being provided with a nut 47 or other suitable means for retaining it in position. The felly plate 45 is preferably provided at one side with an outwardly projecting lug 48, the purpose of which will be explained hereinafter. Screwing on the projecting bolt portion 44 is a sleeve 49 having a head 50 formed for engagement by a wrench or other suitable means for rotating the same, a portion of the sleeve being provided with an external thread, the pitch of which is preferably opposite to that of the thread on the portion 44 of the bolt. Screwing on this externally threaded portion of the sleeve is a keeper 51 which carries near its outer side a projection 52 adapted to engage the flange 32 or other part of the tire-carrying rim when the keeper is moved to operative position, but which projection will lie out of the path of the rim when the keeper is rotated through a part of a revolution. The inner portion of the keeper, 53, is cylindrical, while the central portion of the keeper is partly cylindrical and partly rectangular or shouldered, as indicated at 54 in Figs. 8 and 9. The keeper is also provided at one side with a shoulder 55. The operation of this device is similar to that of the locking device in my previous application referred to. The keeper being in operative position, as shown in Fig. 6, to demount the rim the sleeve 49 is rotated in a direction to cause it to screw off the bolt portion 44, this rotation of the sleeve causing the keeper 51 to move along the sleeve toward the head thereof. This will draw the shouldered portion 54 of the keeper from beneath the edge of the felly band, where it normally fits, preventing rotation of the keeper, and will permit the keeper to be rotated by the further rotation of the sleeve. When the keeper has turned through a half revolution into the position shown in Fig. 7, it will be stopped, however, by the engagement of the shoulder 55 with the under-side of the lug 48. The friction of the latter against the side of the keeper will be sufficient to retain it in this position while the rim is being changed. To return the keeper to operative position, it is simply necessary to rotate the sleeve 49 in the reverse direction, which will first carry the keeper back to upright position, that is, with the projection 52 pointing radially outward, further rotation of the sleeve moving the keeper toward the felly until it is in the position shown in Fig. 6. This construction of locking device is exceedingly compact, as a great part of the keeper is received in the recess 46 in the felly, and it is necessary for the locking device to project only very slightly beyond the felly. The head 50 of the sleeve is thus brought well within the plane of the outer edge of the tire-carrying rim and is effectually protected from injury through engagement with curbs, ruts or other obstacles.

In Fig. 12 I have illustrated another modification of my invention in which the tire-carrying rim comprises an endless band or ring 56 carrying one tire-retaining flange and a split band or ring 57 carrying the other tire-retaining flange. This rim is adapted to be mounted upon a felly band 2 of the form shown in Fig. 4. The ring 56 is provided with a series of spaced inwardly projecting lugs or projections 58 adapted to pass through slots in a flange 59 offset from the body of the split band 57. The slotted flange 59 corresponds to the series of slotted lugs 9 shown in Fig. 3, and it will be readily understood that I may use such a series of lugs in this form of rim in place of the flange, or that I may use a flange such as that shown in Fig. 12 in place of the separated slotted lugs shown in Fig. 3. The lugs 58 project through the flange 29 and their ends are preferably beveled, as indicated at 60, for engagement with the beveled face 12 on the felly band 2. The means for retaining the rim upon the felly band may engage with the lugs 58, as will be readily understood. The engagement between the split rim member 57 and the flange 3 of the felly band serves to prevent the collapsing of the former. For preventing accidental collapse of the split member when the rim is removed from the felly, any suitable locking device such as has been described above may be used, if found desirable or necessary.

Having thus described my invention, I claim:

1. A tire-carrying rim for vehicle wheels, consisting of two rings, a transversely split ring provided with slots and an endless ring having inwardly projecting lugs adapted to enter said slots.

2. A tire-carrying rim for vehicle wheels comprising a transversely split ring having tire-retaining means at one edge thereof and having a slotted projecting portion, and an endless ring provided at its outer edge with means for retaining a tire, said ring also being provided with inwardly projecting lugs adapted to engage the slots in the projecting portion of said split ring.

3. A tire-carrying rim for vehicle wheels comprising a transversely split ring provided at one edge thereof with tire-retaining means, and provided with a laterally projecting slotted extension offset inwardly from the body of the ring, and an endless ring provided at its outer edge with tire-retaining means, said ring inclosing said offset extension and being provided with inwardly projecting lugs adapted to engage the slots therein.

4. A tire-carrying rim for vehicle wheels comprising a transversely split ring having tire-retaining means at one edge thereof and provided with a circumferential series of slots, a second ring provided at its outer edge with means for retaining a tire, said second ring carrying a plurality of inwardly projecting lugs adapted to engage the slots in said first ring, and means for securing the ends of said split ring in position.

5. A tire-carrying rim for vehicle wheels comprising a split ring and an endless ring adapted to inclose a portion of said split ring, each of said rings carrying at its outer edge tire-retaining means, one of said rings being provided with a circumferential series of slots, and the other of said rings carrying a plurality of lugs adapted to enter said slots.

6. A tire-carrying rim for vehicle wheels comprising a transversely split ring having slotted flanges projecting therefrom, and an endless ring having inwardly projecting lugs adapted to seat in said slots and to hold said rings in engagement.

7. A tire-carrying rim for vehicle wheels comprising a transversely split ring having circumferentially spaced slotted projecting flanges and an endless ring having correspondingly circumferentially spaced inwardly projecting lugs adapted to seat in said slots and thereby to hold said rings in engagement.

JAMES H. WAGENHORST.

Witnesses:
SEWARD DAVIS,
EDMUND QUINCY MOSES.